Jan. 20, 1953  W. LOCKHART  2,625,721
CLOSURE LOCKING RING FOR CONTAINERS
Filed Sept. 2, 1948
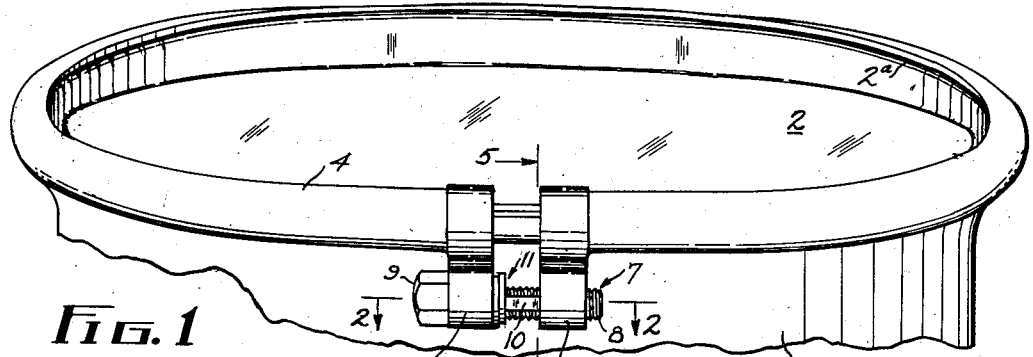
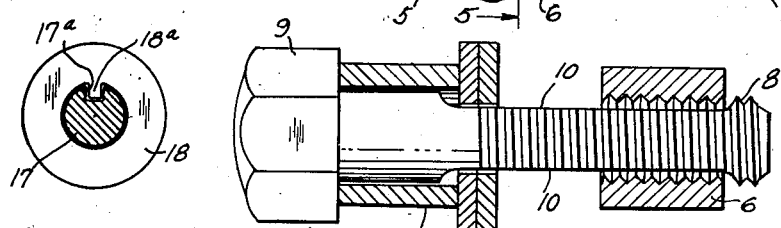
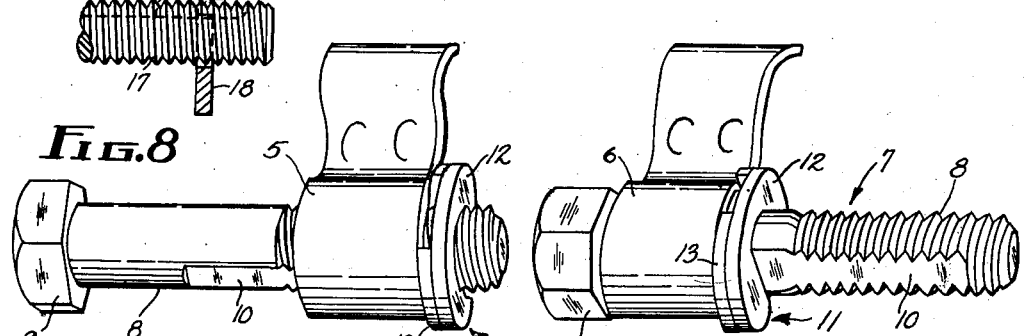
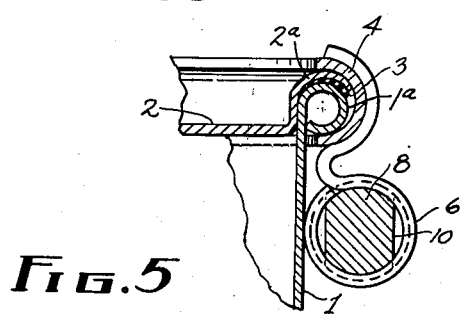
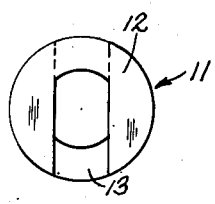
INVENTOR.
William Lockhart
BY
Gehr and Leonard
Attorneys Patented Jan. 20, 1953

2,625,721

UNITED STATES PATENT OFFICE 2,625,721

CLOSURE LOCKING RING FOR CONTAINERS

William Lockhart, Cleveland, Ohio; Sadie Lockhart executrix of said William Lockhart, deceased, assignor to Sadie Lockhart Application September 2, 1948, Serial No. 47,498

1 Claim. (Cl. 24—68)

The invention relates to containers of the metal barrel or drum type and more particularly to means for securing the closures of the containers.

The body of such containers commonly has an end opening defined by an outwardly turned bead at the top edge of the container side wall and is fitted with a flanged closure for the opening. The closure is secured to the body by a transversely split clamping ring formed of a metal strip of channel cross section designed to engage the under side of the container bead and the upper side of the closure flange to force them together when the two ends of the ring are drawn together. Usually a rubber sealing ring is interposed between the said bead and flange parts to insure a tight closure. In some cases the clamping ring is fitted with a toggle lever device to contract the ring while in other cases the ends of the ring are provided with apertured lugs to receive a clamping bolt to contract the ring.

The prior closure rings of the bolted type have been chiefly of two forms. In one form the clamping bolt is readily detachable from the ring so that it can be inserted in the ring lugs after the ring has been contracted by means of a suitable tool or device which holds the clamping ring contracted with its bolt lugs closely adjacent each other to facilitate insertion of the clamping bolt. This contruction has the advantage that the bolt can be made short and easily inserted and tightened with a minimum of wear on the mating screw threads; but it has the serious weakness that the bolts are often lost, with resultant expense and loss of time in effecting replacement. In the second form of construction the loss of clamping bolts is prevented by providing the bolt with a collar spaced from the bolt head so that the head engages one side of the ring lug while the collar engages its other side to prevent escape of the bolts from the lug while permitting free rotation of the bolt in the lug. This construction, however, has the weakness that a quick contraction of the clamping ring on the container by a tool or device such as was mentioned above is not feasible because the bolt, which must have a threaded section of substantial length, prevents bringing the lugs of the clamping ring together other than by rotation of the threaded bolt in the threads of the threaded lug. Accordingly in this type of construction the clamping bolt is made long enough to effect the contraction of the clamping rings, though this is unsatisfactory because of undue time consumed, heavy wear on the screw threads, and danger of injury to the projecting threaded end of the long bolt.

The object of the present invention is to provide a closure clamping ring having a bolt securing means of such character that the bolt is effectively attached to the ring so that it cannot be lost and at the same time will permit the ends of the clamping ring to be brought closely together and held by a contracting tool while the securing bolt is quickly screwed home with a minimum of wear of the mating screw threads.

With the stated object in view the invention consists in the form arrangement and combination of parts hereinafter explained with reference to the accompanying drawing and particularly pointed out by the appended claim.

In the drawing,

Fig. 1 is a fragmentary perspective view of the upper part of a drum or barrel fitted with a clamping ring embodying the present invention.

Fig. 2 is an enlarged section on the line 2—2 of Fig. 1.

Figs. 3 and 4 are enlarged perspective views of the bolt device of the clamping ring which show the bolt in two extreme positions in relation to the ring projection or lug in which it is mounted.

Fig. 5 is an enlarged fragmentary section on the line 5—5 of Fig. 1.

Fig. 6 is an enlarged face view of the special washer device with which the clamping bolt is fitted.

Fig. 7 is a sectional view of an alternative form of bolt and washer construction.

Fig. 8 is a section on the line 8—8 of Fig. 7.

Referring in detail to the structures illustrated in the drawing and first to that shown in Figs. 1–6, the numeral 1 generally designates the body of a metal drum or container of the open top type and formed at its top edge with a rolled bead 1a. The open top of the container is closed by a lid or closure 2 having a lateral flange 2a formed to engage the rolled bead 1a or a packing ring or gasket 3 of rubber or the like interposed between the bead and the flange.

The closure 2 of the container is secured in position by a transversely split clamping ring 4 formed of a metal strip with channel cross section as best shown in Fig. 5. The two ends of the ring 4 having depending lateral projections or lugs 5 and 6 permanently secured to them as by welding. These projections are formed with apertures to receive a clamping bolt which is generally designated by the numeral 7 and comprises a threaded shank part 8 and head 9, the bolt fitting loosely in the projection 5 while the projection 6 is formed with internal screw threads to mate with the threads of the bolt.

The threaded stem part of the bolt is formed on opposite sides with two longitudinally extending flat surfaces each of which gives the bolt an elongated zone 10 with a perpendicular distance from the bolt axis which is less than the radius of the crest of the screw thread. These zones extend from points only a little short of the end of the threaded stem toward the head of the bolt as is indicated in Figs. 2, 3, and 4.

The bolt 7 is fitted with a permanently attached stop means in the form of a washer structure generally designated by the numeral 11 and comprising U-shaped parts 12 and 13, which are preferably integrally united after assembly on the bolt by spot welding to form a unitary structure as shown in Figs. 2, 3, 4, and 6. As is shown in Figs. 2, 3, and 4, the washer can slide freely on the bolt throughout the length of the zones 10 thereof.

The fabrication of the improved clamping ring can be carried out in a variety of ways. For example, the lug or projection 5 having been formed by bending strip material and the clamping bolt 7 having been inserted there through, the parts 12 and 13 of washer 11 can then be assembled on the bolt and welded together. Thereafter the lug 5, carrying the bolt, can be welded to the end of the clamping ring 4. The lug or projection 6 of the ring after being bent to form can have its aperture tapped and can then be welded to the end of ring 4.

In the use of the improved clamping ring device, the ring after being expanded for application to the bead of the container and the flange of the closure can be contracted by a manual tool or device such as has been referred to above, in a manner to bring the two ends of the clamping ring relatively close together. Such positioning of the two ends of the clamping ring by the use of the tool is permitted because the bolt 7 is permitted to slide in its supporting lug 5 from the position shown in the Figs. 1 and 4 to that shown in Fig. 3 so that it will not interfere with the lug 6 when the lugs 5 and 6 are brought into close proximity. The endwise movement of the bolt 7 in the lug 5 is limited by engagement of the washer 11 with the shoulders at the ends of the flat zones 10 adjacent the threaded end of the bolt. Loss of the bolt from the clamping ring is thus effectively prevented.

With the clamping ring applied in the manner indicated and held in contracted form by a tool or device for that purpose, the securing bolt 7 can be moved endwise to bring its threaded end into engagement with the interial threads of the lug 6, and then quickly screwed home to secure the clamping ring in position.

It will be observed that the longitudinal bolt zones of reduced radial dimension may take various forms and either one or more of such zones may be provided. Thus in the alternative construction shown in Figs. 7 and 8, the bolt 17 has its threaded stem formed with a single groove 17a extending from a point short of the threaded end of the bolt toward the head end of the bolt, and the bolt is fitted with a washer 18 having an inwardly extending lug or tooth 18a which projects into the groove 17a, so that the longitudinal movement of the washer on the bolt is limited to the length of the said groove.

In fabricating the bolt and washer assembly shown in Figs. 7 and 8, the washer may be formed initially with lug 18a bent laterally as shown by dotted lines in Fig. 8. When the washer so formed, has been placed on the stem of the bolt, the lug 18a can be bent inwardly as shown in full lines in Fig. 8 to operatively engage the groove 17a of the bolt.

It will be understood that the invention can be embodied in other forms of construction than those shown and described within the bounds of the appended claim which is intended to define the scope of the invention.

What is claimed is:

Clamping means for securing the closures of end-opening containers, said means having in combination a transversely split ring with a laterally projecting lug structure at each end thereof, the said lug structures being apertured and one of them internally threaded; means for contracting the ring comprising a headed bolt with an elongated threaded zone to operatively engage the aperture of the internally threaded lug structure of the ring, the said bolt being slidably mounted for independent longitudinal and rotary movements in the aperture of the other lug structure of the ring with the bolt head disposed to engage the side of said other lug structure remote from the threaded lug structure and the stem of the bolt having an elongated zone having a perpendicular distance from the bolt axis which is substantially less than the radius of the crest of the bolt thread and extending longitudinally of the bolt from a point only a little short of the threaded end thereof toward the head of the bolt in extensive overlapping relation with the said threaded zone; and stop means cooperatively associated with the said zone of smaller radial dimension and the ring lug structure in which the bolt is slidably mounted, for preventing complete longitudinal withdrawal of the bolt from the said lug structure but not its rotation therein, the length of the bolt zone of smaller radial dimension being many times the dimension of the stop means lengthwise of the bolt to permit a long non-rotary incomplete withdrawal movement of the bolt from the said lug structure.

WILLIAM LOCKHART.

REFERENCES CITED

The following references are of record in the file of this patent:

UNITED STATES PATENTS

| Number | Name | Date |
|---|---|---|
| Re. 19,386 | Hand et al. | Nov. 27, 1934 |
| 37,767 | Perley | Feb. 24, 1863 |
| 57,132 | Hickman | Aug. 14, 1866 |
| 89,460 | Ball | Apr. 27, 1869 |
| 198,521 | Reese | Dec. 25, 1877 |
| 525,877 | Wardwell | Sept. 11, 1894 |
| 1,514,411 | Wilkinson | Nov. 4, 1924 |
| 2,121,881 | Newton | June 28, 1938 |
| 2,208,859 | Scott | July 23, 1940 |

FOREIGN PATENTS

| Number | Country | Date |
|---|---|---|
| 21,251 | Australia | Of 1929 |